Feb. 22, 1949.                H. C. INMAN                 2,462,746
                          ELECTRIC FLUID HEATER
Filed May 12, 1947                                    2 Sheets-Sheet 1
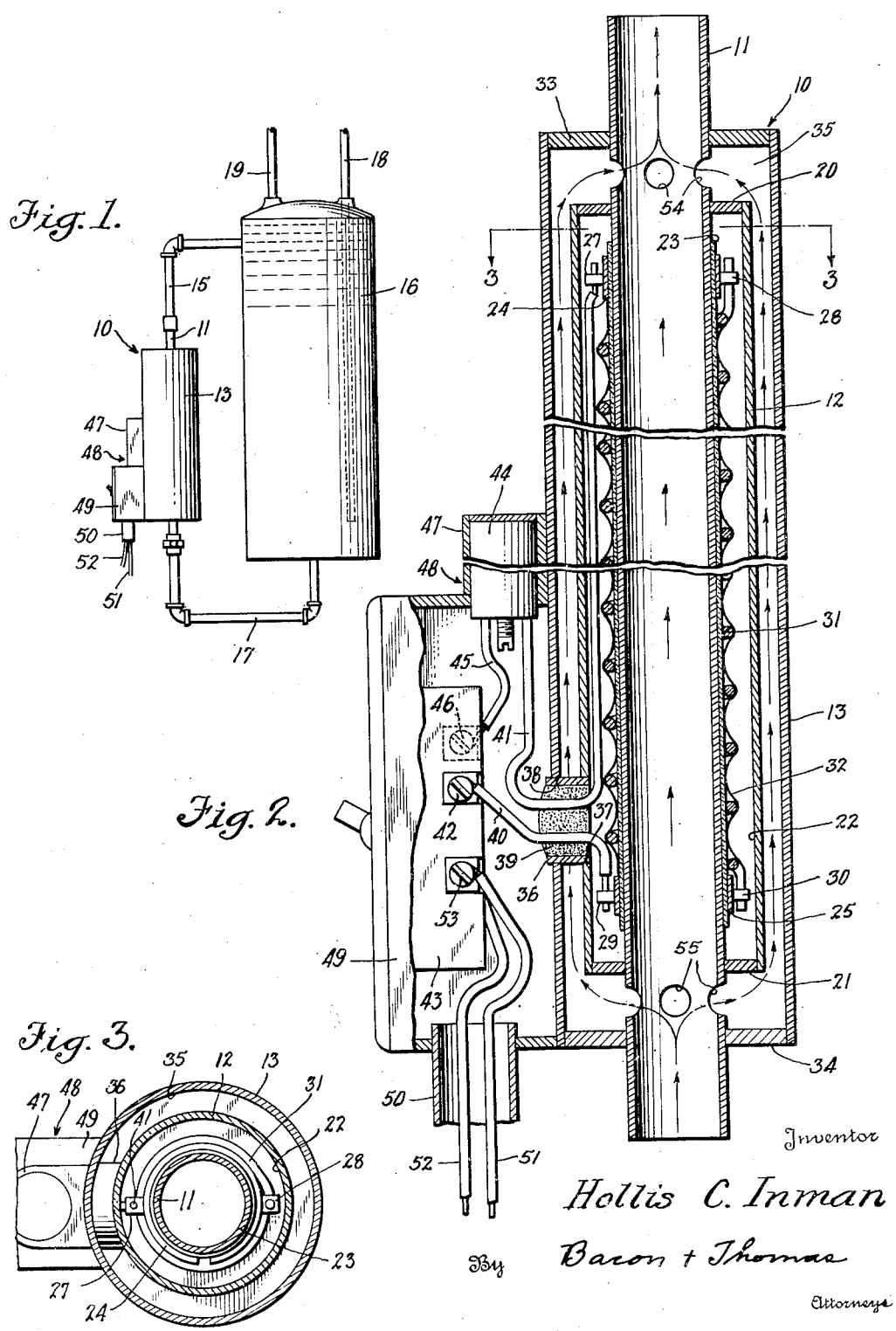

Inventor
Hollis C. Inman
By Bacon + Thomas
Attorneys

Patented Feb. 22, 1949

2,462,746

UNITED STATES PATENT OFFICE 2,462,746

ELECTRIC FLUID HEATER

Hollis Chubbuck Inman, Miami, Fla.

Application May 12, 1947, Serial No. 747,431

5 Claims. (Cl. 219—39)

This invention relates to a heating unit for heating fluid, in either liquid or gaseous form.

More specifically, the invention relates to a fluid heating apparatus or unit including electrical heating means of the resistance type adapted to effect heating of the fluid as it passes therethrough.

The present invention constitutes an improvement over the fluid heating units disclosed in my copending application Serial No. 621,740, filed October 11, 1945.

The principal object of the invention is to provide heating means adapted to be connected in a pipe line to heat a liquid or gas as it is flowing therethrough; or to be associated with a storage tank or boiler as a side arm heater or as an immersion heater, to heat the fluid in said storage tank or boiler.

A more specific object of the invention is to provide an efficient and economical electrical heating unit, particularly adapted for heating water for domestic or industrial use.

Still another object of the invention is to provide an immersion electric heating apparatus of the resistance type that will quickly provide a supply of heated liquid without requiring the heating of a comparatively large body of liquid in a storage tank or boiler.

A further object of the invention is to provide a liquid heating apparatus for association with a storage tank and including thermally responsive means for automatically maintaining the liquid in said storage tank at a predetermined temperature.

A still further object of the invention is to provide liquid heating apparatus consisting of parts made of material (preferably copper) having the same coefficient of thermal expansion so that all joints are relieved of undue stress and strain and all leaks due to unequal expansion of the parts are avoided.

Other objects of the invention will be apparent from the following description taken in conjunction with the accompanying drawings, in which:

Fig. 1 is an enlarged side elevational view of one form of heating unit embodying the principles of the present invention, shown associated with a storage tank as a side arm heater;

Fig. 2 is an enlarged vertical sectional view through the heating unit shown in Fig. 1;

Fig. 3 is a sectional plan view through the heating unit taken on the line 3—3 of Fig. 2;

Figure 4:
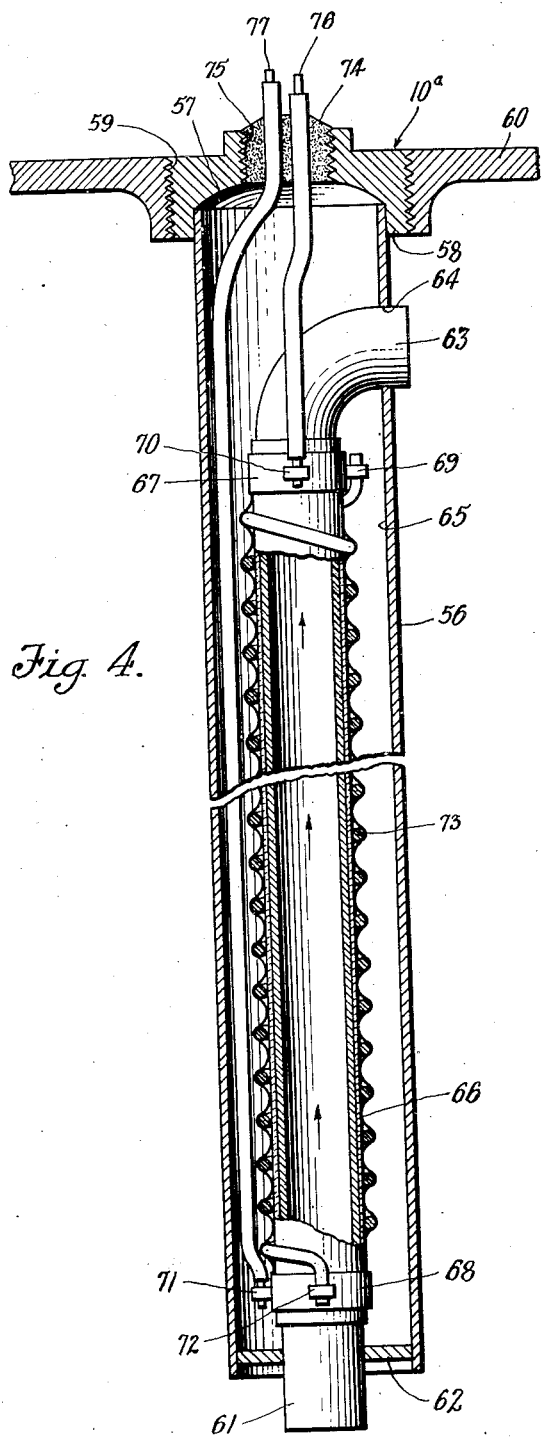
Fig. 4 is a vertical sectional view through a modified form of heating unit embodying the principles of the invention and adapted to serve as an immersion type of heater.

Referring now to Figs. 1 to 3, inclusive, of the drawings, the fluid heating unit is generally identified by the numeral 10 and comprises a central, cylindrical upright copper tube or duct 11, a copper casing 12 arranged in concentric spaced relation relative to said tube and a copper jacket 13 similarly arranged relative to said casing. The tube 11 obviously may be connected in a pipe line (not shown) and used without a storage tank, or the upper end of the tube 11 may be connected to one end of a pipe 15 having its opposite end connected with the upper end of a storage tank 16, and the lower end of said tube may be connected to one end of a pipe 17 having its opposite end connected with the lower end of the storage tank 16. A cold water supply pipe 18 and a hot water service pipe 19, respectively, are connected to the upper end of the storage tank 16. The lower end of the cold water supply pipe 18 preferably extends to a point near the lower end of the tank 16 so that a strata or "cap" of heated water will always be available for withdrawal through the hot water service pipe 19, as will be explained in further detail later.

The casing 12 (Fig. 2) has an annular copper closure member 20 at the upper end thereof and a similar closure member 21 at the lower end thereof. The closure members 20 and 21 surround the tube 11 and are in turn surrounded by the casing 12, the parts being soldered, brazed or otherwise bonded to provide a leakproof heating compartment 22 surrounding the tube 11. A covering of conventional heat resisting, electric insulating material 23, preferably a preformed tube of mica and a binder, is slipped onto and closely surrounds the tube 11 within the compartment 22. Resilient clamping bands or rings 24 and 25 are arranged adjacent the opposite ends of the mica tube 23 and these clamping rings are split and self-contractible for retaining themselves in place around the mica tube 23, as indicated by way of example in Fig. 3.

The clamping ring 24 may be made of tempered steel, spring brass, or any other suitable spring material and carries contact lugs 27 and 28. Likewise, the clamping ring 25 may be made of similar material and carries contact lugs 29 and 30.

A resistance coil type of heating element 31 is helically wound upon the outer surface of the mica tube 23, and one end thereof is suitably secured to the lug 29 on the ring 24 and its opposite end is suitably secured to the lug 30 on the ring 25. The heating element 31 is preferably made of "Nichrome," but may be made of any other conventional or suitable material capable of developing high heat upon the passage of electric current therethrough. In any event, the heating coil 31 is preferably covered with a layer of fiber glass 32, which is a well known heat resisting, electrical insulating material. The clamping rings 24 and 25 anchor the heating coil 31 against the normal pull of said coil as it expands and contracts upon heating and cooling.

The jacket 13 is of larger diameter and greater length than the casing 12, as will be apparent from Fig. 2, and is closed at its upper end by an annular copper closure member 33 and is closed at its lower end by a similar closure member 34. The closure members 33 and 34 are soldered, brazed, or otherwise secured to both the tube 11 and the jacket 13 to provide a leakproof fluid passage 35 surrounding the casing 12. A cylindrical copper sleeve 36 is disposed in aligned openings 37 and 38 formed in the casing 12 and the jacket 13, respectively, and is secured thereto by soldering, brazing, or other means to provide a fluid-tight connection therewith. A heat-resistant sealing member 39 is mounted in the sleeve 36 and conductors or lead wires 40 and 41 extend through said member. One end of the conductor 40 is secured to the contact lug 29 on the ring 25 and its opposite end is secured to a contact 42 on a manually operable switch 43. One end of the conductor 41 is secured to the contact lug 27 on the ring 24 and its opposite end is secured to a conventional or suitable, adjustable thermostat 44. Another conductor 45 connects the thermostat 44 with a contact 46 on the switch 43.

The thermostat 44 is mounted in a cylindrical portion 47 of a housing 48, which may be made of copper and secured in thermal contact with the jacket 13 so that said thermostat is responsive to the temperature of the water in the jacket space 35. The housing 48 is enlarged at its lower end 49 to receive the switch 43 as indicated, and also serves as a housing for said switch. The lower housing portion 49 has a conduit 50 secured thereto through which extend leads 51 and 52 connected with contact means 53 for supplying electrical current to the switch 43, as is well understood.

The tube 11 has openings 54 located at a point between the closure members 20 and 33, in order to establish communication between the interior of said tube and the upper end of the fluid space 35, and openings 55 located between the closure members 21 and 34 to establish communication between the interior of said tube and the lower end of said fluid space.

In the normal operation of the device illustrated in Figs. 1 to 3, the water to be heated passes from the lower end of the storage tank 16 through the pipe 17 into the lower end of the unobstructed tube 11 and flows through said tube as a central stream. The major portion of the water entering the tube 11 will pass directly therethrough, but a substantial portion will be diverted or diverge through the openings 55 and pass into the jacket 13 for flow through the space 35 in the form of an annular stream in contact with the exterior of the casing 12. The water diverted into the jacket space 35 again re-enters or converges with the central stream in the tube 11 by passing through the openings 54. Thus, the divergence of water from the central stream into the annular stream and the convergence of water from the annular stream into the central stream are the same at both ends of the unit.

Assuming that the switch 43 is in closed position, electrical current will pass through the heating coil 31 with the result that intense heat will be produced thereby. This heat will pass through the mica insulation 23 and be transmitted by the tube 11 directly to the water flowing through the same. Simultaneously, some of the heat thus produced will pass through the insulation material 32 and the air within the chamber 22 and be conducted by the casing 12 to the water in the jacket space 35, whereby to heat the fluid diverted into said space. The heating coil 31 extends for a considerable distance along the length of the tube 11 so that as the fluid flows upwardly therethrough, and upwardly in the jacket space 35, it is progressively heated and is quite hot by the time it reaches the upper end of said tube.

If the heating device 10 is connected in a separate pipe line (not shown) the water thus heated is ready for instantaneous use. On the other hand, if the heater 10 is associated with a storage tank 16, as previously described, the heated water emerging from the upper end of the tube 11 will pass through the pipe 15 into the upper end of said storage tank and form a "cap" or stratum of heated water which progressively increases in depth without substantial turbulence. This "cap" provides heated water which is available for immediate withdrawal through the hot water service pipe 19. Circulation is normally induced between the storage tank 16 and heater 10 by thermal action, which causes the relatively cooler water at the lower end of the storage tank 16 to flow into the heater 10 and to be discharged therefrom into the upper end of said storage tank.

Experiments have shown that hot and cold water in the same heating system constantly seek their own levels and hence, for any given static head of hot water in the tank 16 there will be a corresponding static head of hot water in the jacket space 35 of the heater 10. The foregoing is true notwithstanding the fact that there is a free flow of water between the heater 10 and storage tank 16. Accordingly, the head of the hot water in the jacket space 35 will reach a depth sufficient to effect actuation of the thermostat 44, whereupon the flow of current to the heating coil 31 will be interrupted, as will be readily understood, and heating of the liquid will be discontinued. It will also be apparent that as the heated water is withdrawn from the storage tank 16 it will be replaced by relatively cool water and the static head of hot water will change in the tank 16 and in the jacket space 35, thereby effecting actuation of the thermostat 44 in a manner such that the circuit to the heating coil 31 will be closed and current will flow through said coil to effect heating of the water, as previously described.

The purpose of the fluid space 35 is to absorb the heat that is radiated outwardly from the heating coil 31 through the casing 12, and which would otherwise be lost to the surrounding air and result in inefficient operation of the heater. Hence, the provision of the fluid space 35 surrounding the casing 12 results in economy and efficient operation and also maintains the heating coil 31 at a relatively low temperature. Heat losses through the jacket 13 are practically negligible so that it is unnecessary to heat insulate said jacket, although such insulation may be provided if a maximum of economy is desired.

Figure 5:
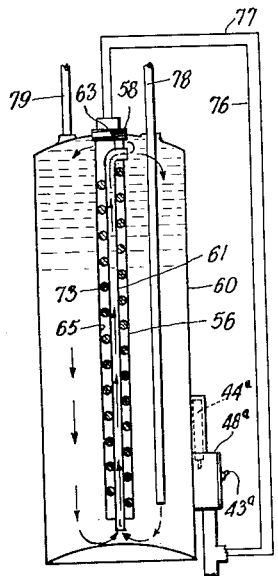
Fig. 5 is a diagrammatic view illustrating the manner in which the immersion type of heater of Fig. 4 may be mounted upon the upper end of a storage tank.

Fig. 4 illustrates a heater generally identified by the numeral 10ª, embodying certain of the structural features of the heater shown in Figs. 1 to 3, but modified so that it can serve as an immersion type of heater. The heater 10ª comprises a cylindrical copper casing 56 having its upper end snugly received in a recess 57 formed in a copper plug 58. The casing 56 is soldered, brazed, or otherwise secured in fluid-tight relation to said plug. The exterior of the plug 58 is threaded and mounted in a correspondingly threaded opening 59 formed in the upper end of a storage tank 60 (Fig. 5). A copper tube 61 is arranged concentrically in the casing 56 and an annular copper closure member 62 is soldered, brazed, or otherwise secured in fluid-tight relation to both the tube 61 and the casing 56 at the lower end of said casing. The tube 61 has an upper end 63 which extends at a right angle to the main body portion of said tube and projects through an opening 64 formed in the side of the casing 56. The upper end 63 of the tube 61 is soldered, brazed, or otherwise secured in the opening 64 so that here again a fluid-tight connection is provided. The casing 56, tube 61, closure member 62, and the plug 58 are thus assembled to form a compartment 65 which is sealed against the entrance of any water thereinto. The portion of the tube 61 within the compartment 65 is covered, as indicated at 66, for substantially its entire length, by mica (similar to the covering 23), and is held in place by clamping rings 67 and 68 similar to the clamping rings 24 and 25. The clamping ring 67 carries contact lugs 69 and 70 and the clamping ring 68 carries contact lugs 71 and 72. A heating coil 73 of the resistance type, similar to the heating coil 31, is wound around the mica covering 66 and one end thereof is secured to the contact 69 and the other end is secured to the contact 72. A body of sealing material 74 is mounted in an opening 75 formed in the plug 58, and lead wires 76 and 77 extend therethrough and into the chamber 65. One end of the lead wire 76 is connected with the contact 70 and one end of the lead wire 77 is connected with the contact 71. The opposite ends of the lead wires 76 and 77 are connected with a thermostat 44ª and switch 43ª, similar to the thermostat 44 and switch 43, mounted in a housing 48ª, similar to the housing 48 already described in detail, mounted on the outside of the tank 60.

Referring to Fig. 5, a cold water inlet pipe 78 and a hot water service pipe 79, respectively, are connected to the upper end of the storage tank 60. The arrows in Fig. 5 indicate the movement of the water within the storage tank 60. Thus, the heat produced by the heating coil 73 causes a thermal circulation of the water within the storage tank 60 such that relatively cool water enters the lower end of the tube 61 and flows upwardly through said tube for discharge through the upper end 63 thereof at a point adjacent the uppermost portion of the storage tank 60, so that a "cap" of hot liquid is always available for withdrawal through the hot water service pipe 79.

The water flowing through the tube 61 is heated by the heat conducted thereto through the tube 61, and the body of water surrounding the casing 56 is heated by the heat conducted thereto through the casing 56, so that none of the heat produced by the coil 73 is lost and the heating unit 10ª therefore operates at a very high efficiency.

Figure 6:
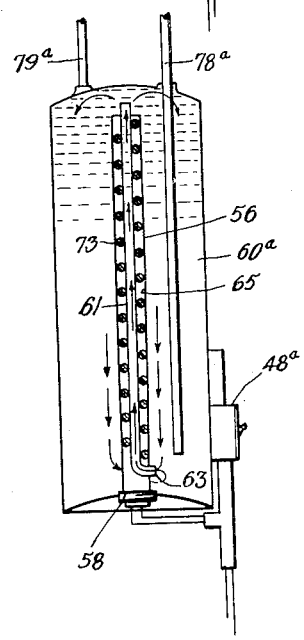
Fig. 6 is a view similar to Fig. 5, diagrammatically illustrating the manner in which the heating unit of Fig. 4 may be mounted upon the lower end of a storage tank.

Fig. 6 is a diagrammatic view somewhat similar to Fig. 5, but shows the plug 58 mounted in the lower end of a storage tank 60ª, instead of in the upper end of the tank 60 as in Fig. 5. In Fig. 6, the thermally induced circulation of the water within the tank occurs upwardly through the tube 61, the water entering through the tube end 63 and flowing upwardly for discharge at a point adjacent the upper end of the tank 60ª. The transfer of the heat to the water in Fig. 6 occurs in the same manner as that described in connection with Fig. 5. The tank 60ª, of course, is provided with a cold water inlet pipe 78ª and a hot water service pipe 79ª. Thus, irrespective of whether the immersion heater 10ª is mounted in the top or in the bottom of a storage tank, the unit will operate at high efficiency without appreciable heat loss.

In all embodiments of the invention disclosed herein, the winding of the heating coil with its convolutions uniformly spaced throughout the near full length of the central duct provides a convenient way to control the distribution or concentration of the intense heat produced by said heating coil. Moreover, by surrounding the heating chambers with the fluid to be heated, a higher rate of heat absorption by the fluid, and an extremely comparatively low coil temperature, are obtained, resulting in a long life of the heating coil and in a minimum of solids deposited upon the heat transfer surfaces of the heating units. In addition, by discharging the heated water into the top of the storage tanks, a heated "cap" of fluid is formed as shown by the dotted lines in Figs. 1, 5 and 6, which progressively increases in depth as the water is heated. This is accomplished without mixture or turbulence between the hot and cold water so that a maximum temperature is maintained in the body of heated water as against an average temperature obtained in other types of heaters.

It will be understood that various changes may be made in the details of construction and in the arrangement of the parts of the heating units disclosed herein, without departing from the spirit of the invention or the scope of the annexed claims.

I claim:

1. A fluid heater, comprising: a tubular duct providing a passage for a central fluid stream; a casing providing an elongated closed chamber surrounding said tubular duct; electrical heating means in said chamber; and a jacket surrounding said tubular duct and enclosing said casing, said jacket being of greater length and greater transverse dimension than said casing and providing an annular fluid space about the periphery and ends of said casing for an annular fluid stream, said tubular duct having identical openings establishing communication between the interior thereof and the spaces in said fluid jacket at the respective ends of said casing, whereby the divergence of fluid from the central fluid stream into the annular fluid stream and the convergence of fluid from the annular fluid stream into the central fluid stream are the same at both ends of the heater.

2. A fluid heater, comprising: a casing; a tube for fluid to be heated, said tube providing a passage for a central fluid stream and being of smaller diameter than said casing and extending axially of said casing and providing an annular space for a heating element between said tube and casing; a covering of heat insulating material surrounding said tube within said casing; a metal band at each end of said covering securing said covering in place around said tube; a helical resistance heating element in said casing surrounding said covering and having its opposite ends connected to said bands; a lead wire connected to each of said bands; and a jacket surrounding said tube and enclosing said casing, said jacket being of greater length and greater transverse dimension than said casing and providing an annular fluid space about the periphery and ends of said casing for an annular fluid stream, said tube having identical openings establishing communication between the interior thereof and the spaces in said fluid jacket at the respective ends of said casing, whereby the divergence of fluid from the central fluid stream into the annular fluid stream and the convergence of fluid from the annular fluid stream into the central fluid stream are the same at both ends of the heater.

3. A fluid heater, comprising: a central tube providing a passage for a central fluid stream; a casing surrounding said tube and being closed at its opposite ends; a jacket surrounding said tube, said jacket being of greater diameter than said casing and of greater length than said casing, and being closed at its opposite ends to provide an annular space for an annular fluid stream surrounding said tube and casing, said tube having identical openings establishing communication between the interior thereof and the interior of said jacket at points located outwardly of the ends of said casing, whereby the divergence of fluid from the central fluid stream into the annular fluid stream and the convergence of fluid from the annular fluid stream into the central fluid stream are the same at both ends of the heater; a circuit including electrical heating means in said casing for simultaneously heating fluid in said tube and in said jacket; and a thermostat in said circuit responsive to the temperature of fluid in said jacket controlling the supply of current to said heating means.

4. A fluid heater, comprising: a tubular duct providing a passage for a central fluid stream; a cylindrical casing arranged concentric with said duct; closure members for said casing at the opposite ends thereof engaging said tubular duct and forming an elongated closed chamber surrounding said tubular duct; electrical resistance heating means in said chamber; a cylindrical jacket arranged concentrically with said casing, said cylindrical jacket being of greater diameter and greater length than said casing; closure members at the ends of said jacket engaging said tubular duct and forming a sealed fluid chamber for an annular fluid stream about said casing, said tubular duct having identical openings establishing communication between the interior thereof and said fluid chamber, whereby the divergence of fluid from the central fluid stream into the annular fluid stream and the convergence of fluid from the annular fluid stream into the central fluid stream are the same at both ends of the heater, said casing and jacket having aligned openings at one side thereof; a sleeve mounted in said openings and bridging said fluid chamber at said one side; and lead wires extending through said sleeve and connected with said electrical resistance heating means.

5. A fluid heater having uniform thermal expansion, comprising: a copper jacket; a copper casing of shorter length and smaller diameter than said jacket disposed concentrically within said jacket and spaced therefrom to provide an annular fluid passage therebetween; a tubular copper duct of smaller diameter than said casing extending through said jacket and casing and providing an annular space between said casing and said tubular duct, said tubular duct having a central passage for a central fluid stream; copper closure members adjacent the opposite ends of said casing converting said annular space into a heating compartment surrounding said tube; copper closure members between said tube and the ends of said jacket converting said annular fluid space into a passage for an annular fluid stream, said tubular duct having identical openings therein located at a region between the closure members at the ends of said casing and the closure members at the ends of said jacket and establishing communication between the interior of said duct and said annular fluid passage, whereby the divergence of fluid from the central fluid stream into the annular fluid stream and the convergence of fluid from the annular fluid stream into the central fluid stream are the same at both ends of the heater; a covering of mica surrounding said tube in said heating compartment; and electrical resistance heating means wound upon said mica covering in said heating compartment for simultaneously heating fluid in said tubular duct and in said fluid compartment.

HOLLIS CHUBBUCK INMAN.

REFERENCES CITED

The following references are of record in the file of this patent:

UNITED STATES PATENTS

| Number | Name | Date |
|---|---|---|
| 1,445,919 | Stone | Feb. 20, 1923 |
| 1,451,863 | Clark | Apr. 17, 1923 |
| 1,614,974 | Strauss | Jan. 18, 1927 |
| 1,674,369 | McQuinn | June 19, 1928 |
| 1,723,733 | Hyde et al. | Aug. 6, 1929 |
| 1,780,426 | Hyde | Nov. 4, 1930 |
| 1,994,765 | Harvey | Mar. 19, 1935 |